(12) United States Patent
Colavincenzo et al.

(10) Patent No.: US 11,024,285 B2
(45) Date of Patent: Jun. 1, 2021

(54) NOISE-REDUCTION IN AIRCRAFT (71) Applicant: BOMBARDIER INC., Dorval (CA)

(72) Inventors: Stephen Colavincenzo, Toronto (CA); Thineshan Kathirchelvan, Markham (CA); Alexis Caron-L'Ecuyer, Lachine (CA)

(73) Assignee: BOMBARDIER INC., Dorval (CA)

( * ) Notice: Subject to any disclaimer, the term of this patent is extended or adjusted under 35 U.S.C. 154(b) by 0 days.

(21) Appl. No.: 16/717,489

(22) Filed: Dec. 17, 2019

(65) Prior Publication Data

US 2020/0202838 A1 Jun. 25, 2020

Related U.S. Application Data

(60) Provisional application No. 62/782,320, filed on Dec. 19, 2018.

(51) Int. Cl.
*G10K 11/178* (2006.01)

(52) U.S. Cl.
CPC .......... *G10K 11/17873* (2018.01); *G10K 2210/1281* (2013.01); *G10K 2210/3044* (2013.01)

(58) Field of Classification Search
None
See application file for complete search history.

(56) References Cited

U.S. PATENT DOCUMENTS

| | | | |
|---|---|---|---|
| 5,845,236 A | 12/1998 | Jolly et al. | |
| 8,068,616 B2 | 11/2011 | Copley et al. | |
| 9,090,332 B2 | 7/2015 | Asao et al. | |
| 2006/0262935 A1* | 11/2006 | Goose | H04S 3/002 |
| | | | 381/17 |
| 2015/0055790 A1* | 2/2015 | Kawakami | G10K 11/175 |
| | | | 381/73.1 |
| 2015/0358728 A1 | 12/2015 | Trammell | |
| 2017/0301338 A1 | 10/2017 | Butts et al. | |
| 2018/0075835 A1 | 3/2018 | Hatakeyama et al. | |

* cited by examiner

*Primary Examiner* — Kenny H Truong
(74) *Attorney, Agent, or Firm* — Norton Rose Fulbright Canada (57) ABSTRACT

Systems and methods for performing noise reduction in a vehicle comprising a noise reduction system and a plurality of zones are herein provided. A noise reduction criterion for the vehicle is obtained. A first one of the plurality of zones for which noise reduction is to be performed is determined, based on the noise reduction criterion. The noise-reduction system is controlled to perform noise reduction in the first zone, wherein performing noise reduction in the first zone causes the noise reduction system to effect a resultant adjustment in noise level in at least a second one of the plurality of zones.

23 Claims, 5 Drawing Sheets

NOISE-REDUCTION IN AIRCRAFT

CROSS-REFERENCE TO RELATED APPLICATIONS

The present application claims the benefit of U.S. Provisional Patent Application No. 62/782,320, filed on Dec. 19, 2018, the contents of which are incorporated herein by reference.

TECHNICAL FIELD

The present disclosure relates generally to noise-reduction systems, and more specifically to adjustable noise-reduction systems used in aircraft.

BACKGROUND

Modern aircraft increasingly seek to offer comfortable cabin accommodations, whether for business or leisure. Current aircraft cabins can feature expansive in-flight entertainment (IFE) options, Internet connectivity for videoconferencing and video streaming, reclining and/or lay-flat seats, and the like. These features can help passengers be more productive during transit, or allow passengers to rest and relax while travelling.

In addition, modern aircraft can include various noise-reduction systems. Some approaches to noise-reduction are passive, such as sound isolating materials or cabin constructions for aircraft. Other approaches are active: for example, synchrophasing of aircraft propellers can be used to reduce noise in the aircraft cabin, by setting an appropriate phase difference between propellers such that the acoustic waves produced thereby combine in a reduced resultant acoustic wave. Another approach for active noise reduction includes using acoustic wave emitters, such as speakers, to produce acoustic waves which serve to cancel out other ambient sounds detected within the cabin.

Traditional approaches have focused on minimizing worst-case noise within a cabin, or ensuring substantially uniform noise reduction throughout an aircraft cabin. However, these approaches can be unsatisfactory for aircraft with smaller numbers of passengers, or for aircraft in which passengers may be present in only some areas of the aircraft at any given time.

There is therefore room for improvements.

SUMMARY

In accordance with a broad aspect, there is provided a method for performing noise reduction in a vehicle comprising a noise reduction system and a plurality of zones. A noise reduction criterion for the vehicle is obtained. A first one of the plurality of zones for which noise reduction is to be performed is determined, based on the noise reduction criterion. The noise-reduction system is controlled to perform noise reduction in the first zone, wherein performing noise reduction in the first zone causes the noise reduction system to effect a resultant adjustment in noise level in at least a second one of the plurality of zones.

In some embodiments, performing noise reduction in the first zone results in an increase in a noise level for the at least one second zone.

In some embodiments, the resultant adjustment in noise level produces an increase in the noise level in the at least one second zone.

In some embodiments, the increase in the noise level sets the noise level to a predetermined maximum noise level.

In some embodiments, the predetermined maximum noise level is associated with at least one of an industry standard and a regulatory policy.

In some embodiments, the resultant adjustment in noise level produces a decrease in the noise level in the at least one second zone.

In some embodiments, the at least one second zone comprises substantially the entire vehicle excepting the first zone.

In some embodiments, the at least one second zone comprises a portion of the vehicle different from the first zone.

In some embodiments, the first zone comprises a vicinity of a grouping of seats within the vehicle.

In some embodiments, the first zone comprises a vicinity of an entertainment device within the vehicle.

In some embodiments, the first zone comprises a vicinity of resting quarters within the vehicle.

In some embodiments, obtaining the noise reduction criterion comprises obtaining, from a personal electronic device, an indication of a location of the personal electronic device within the vehicle, wherein the first zone comprises at least the location.

In some embodiments, the indication is issued by the personal electronic device in response to a user input.

In some embodiments, the indication is issued by the personal electronic device in response to the personal electronic device detecting a change in the location of the personal electronic device.

In some embodiments, the change in location of the personal electronic device is detected by sensing movement of a user of the personal electronic device.

In some embodiments, obtaining the noise reduction criterion comprises obtaining, from a noise-detection system of the vehicle, an indication of the first zone based on a sound produced by a passenger of the vehicle and detected by the noise-detection system.

In some embodiments, obtaining the noise reduction criterion comprises obtaining the noise reduction criterion in response to occurrence of an event within the vehicle, wherein the event is one of: activation of an entertainment device within the vehicle, activation of a lighting system within the vehicle, activation of a climate-control system within the vehicle, and a passenger of the vehicle entering a room within the vehicle.

In some embodiments, the noise reduction criterion is indicative of a location within the vehicle at which a passenger of the vehicle is present.

In some embodiments, the noise reduction criterion is indicative of a location within the vehicle at which a passenger of the vehicle is expected to be present.

In some embodiments, the noise reduction criterion is indicative of an operating condition of an entertainment device of the vehicle.

In some embodiments, the noise reduction criterion is indicative of a time of day.

In some embodiments, the noise reduction criteria specifies at least one of: the first zone, the at least one second zone, an amount of noise reduction to perform in the first zone, and a type for the resultant adjustment in the at least one second level of noise reduction.

In some embodiments, controlling the noise-reduction system of the vehicle comprises adjusting, based on the noise reduction criterion, a weighting factor of a noise-reduction algorithm governing the noise-reduction system.

In some embodiments, controlling the noise-reduction system of the vehicle comprises adjusting the operation of at least one of an active noise-reduction system and an engine-synchrophasing module.

In some embodiments, the noise reduction criteria specifies a tonality of noise to be reduced.

In accordance with another broad aspect, there is provided a system for performing noise reduction in a vehicle comprising a plurality of zones. The system comprises a noise-reduction system capable of performing noise reduction in each of the plurality of zones, a processing unit communicatively coupled to the noise-reduction system and configured for controlling operation thereof, and a non-transitory computer-readable medium having stored thereon computer-readable instructions. When executed by the processing unit, the instructions cause the processing unit to perform: obtaining a noise reduction criterion for the vehicle; determining, based on the noise reduction criterion, a first one of the plurality of zones for which noise reduction is to be performed; and controlling the noise-reduction system to perform noise reduction in the first zone, wherein performing noise reduction in the first zone causes the noise reduction system to effect a resultant adjustment in noise level in at least a second one of the plurality of zones.

In some embodiments, performing noise reduction in the first zone results in an increase in a noise level for the at least one second zone.

In some embodiments, the resultant adjustment in noise level produces an increase in the noise level in the at least one second zone.

In some embodiments, the increase in the noise level sets the noise level to a predetermined maximum noise level.

In some embodiments, the predetermined maximum noise level is associated with at least one of an industry standard and a regulatory policy.

In some embodiments, the resultant adjustment in noise level produces a decrease in the noise level in the at least one second zone.

In some embodiments, the at least one second zone comprises substantially the entire vehicle excepting the first zone.

In some embodiments, the at least one second zone comprises a portion of the vehicle different from the first zone.

In some embodiments, the first zone comprises a vicinity of a grouping of seats within the vehicle.

In some embodiments, the first zone comprises a vicinity of an entertainment device within the vehicle.

In some embodiments, the first zone comprises a vicinity of resting quarters within the vehicle.

In some embodiments, obtaining the noise reduction criterion comprises obtaining, from a personal electronic device, an indication of a location of the personal electronic device within the vehicle, wherein the first zone comprises at least the location.

In some embodiments, the indication is issued by the personal electronic device in response to a user input.

In some embodiments, the indication is issued by the personal electronic device in response to the personal electronic device detecting a change in the location of the personal electronic device.

In some embodiments, the change in location of the personal electronic device is detected by sensing movement of a user of the personal electronic device.

In some embodiments, obtaining the noise reduction criterion comprises obtaining, from a noise-detection system of the vehicle, an indication of the first zone based on a sound produced by a passenger of the vehicle and detected by the noise-detection system.

In some embodiments, obtaining the noise reduction criterion comprises obtaining the noise reduction criterion in response to occurrence of an event within the vehicle, wherein the event is one of: activation of an entertainment device within the vehicle, activation of a lighting system within the vehicle, activation of a climate-control system within the vehicle, and a passenger of the vehicle entering a room within the vehicle.

In some embodiments, the noise reduction criterion is indicative of a location within the vehicle at which a passenger of the vehicle is present.

In some embodiments, the noise reduction criterion is indicative of a location within the vehicle at which a passenger of the vehicle is expected to be present.

In some embodiments, the noise reduction criterion is indicative of an operating condition of an entertainment device of the vehicle.

In some embodiments, the noise reduction criterion is indicative of a time of day.

In some embodiments, the noise reduction criteria specifies at least one of: the first zone, the at least one second zone, an amount of noise reduction to perform in the first zone, and a type for the resultant adjustment in the at least one second level of noise reduction.

In some embodiments, controlling the noise-reduction system of the vehicle comprises adjusting, based on the noise reduction criterion, a weighting factor of a noise-reduction algorithm governing the noise-reduction system.

In some embodiments, controlling the noise-reduction system of the vehicle comprises adjusting the operation of at least one of an active noise-reduction system and an engine-synchrophasing module.

In some embodiments, the noise reduction criteria specifies a tonality of noise to be reduced.

Features of the systems, devices, and methods described herein may be used in various combinations, and may also be used for the system and computer-readable storage medium in various combinations.

BRIEF DESCRIPTION OF THE DRAWINGS

Further features and advantages of embodiments described herein may become apparent from the following detailed description, taken in combination with the appended drawings, in which.

It will be noted that throughout the appended drawings, like features are identified by like reference numerals.

DETAILED DESCRIPTION

Figure 1:
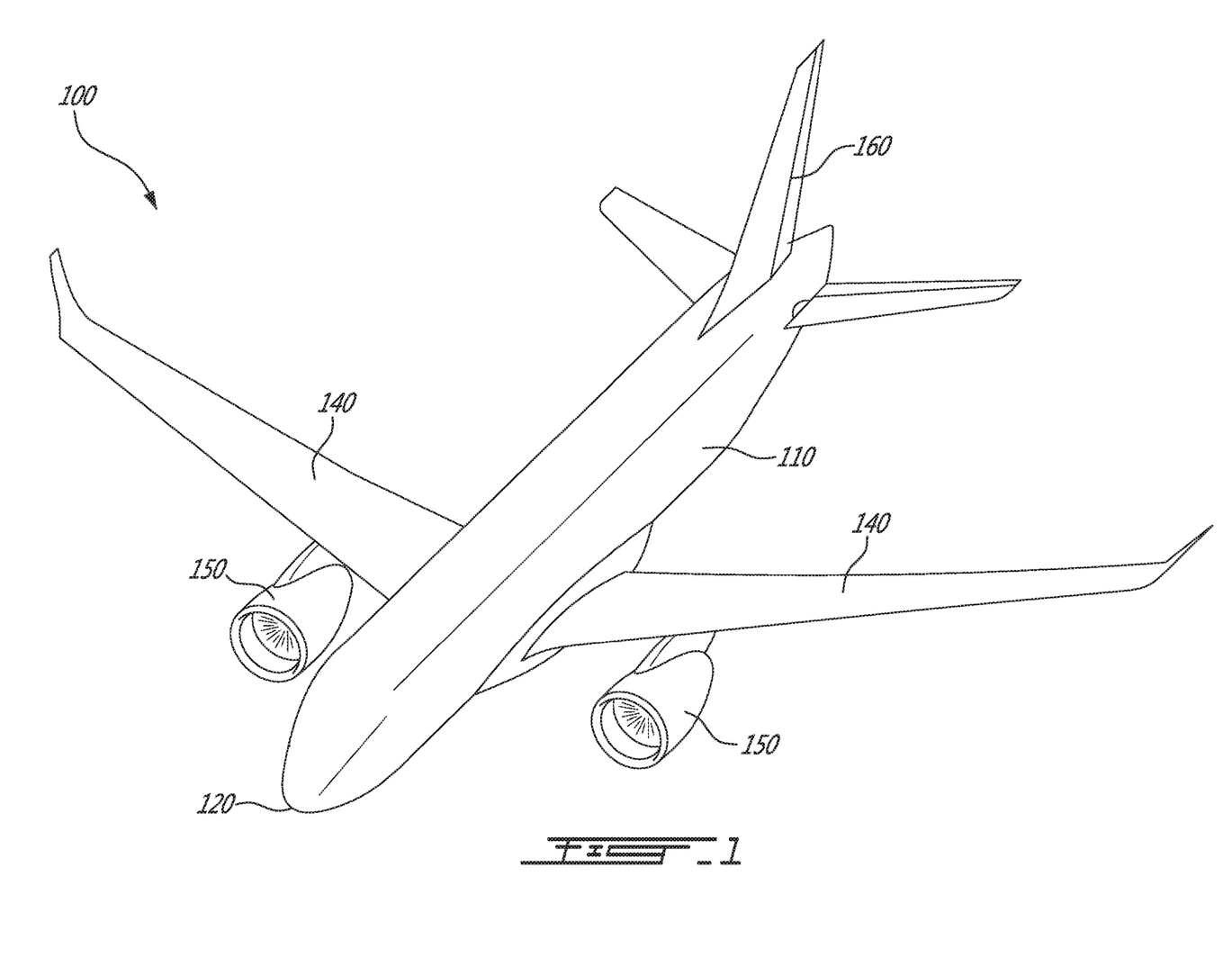
FIG. 1 is a diagram of an example aircraft.

With reference to FIG. 1, an aircraft 100 is illustrated, having a fuselage 110, a pair of wings 140 (or more), engines 150, and a tail 160. Aircraft 100 may be any suitable aircraft such as corporate, private, commercial, or any other type of aircraft. For example, aircraft 100 may be a narrow-body, twin engine jet airliner. Aircraft 100 may be a fixed wing or a rotary wing aircraft. The fuselage 110 has a cockpit 120, which can be positioned at any suitable location on the aircraft 100, for example at a front portion of the fuselage 110. The cockpit 120 is configured for accommodating one or more pilots who control the aircraft 100 by way of one or more operator controls. The operator controls can include any suitable number of pedals, yokes, steering wheels, centre sticks, flight sticks, levers, knobs, switches, computer-based input, and the like. Although two engines 150 are illustrated, it should be understood that the aircraft 100 can have any suitable number of engines, which can include turbojet engines, turbofan engines, turbopropeller engines, and the like.

It should additionally be noted that although the foregoing discussion focuses primarily on aircraft-related implementations, the techniques described herein can be applied to various other vehicles, including automobiles, trucks, boats, trains, subways, cable-cars, tramways, spacecraft, and the like. Furthermore, at least some of the techniques described herein can be applied to stationary structures and buildings, including homes, offices, factories, and the like.

Figure 2:
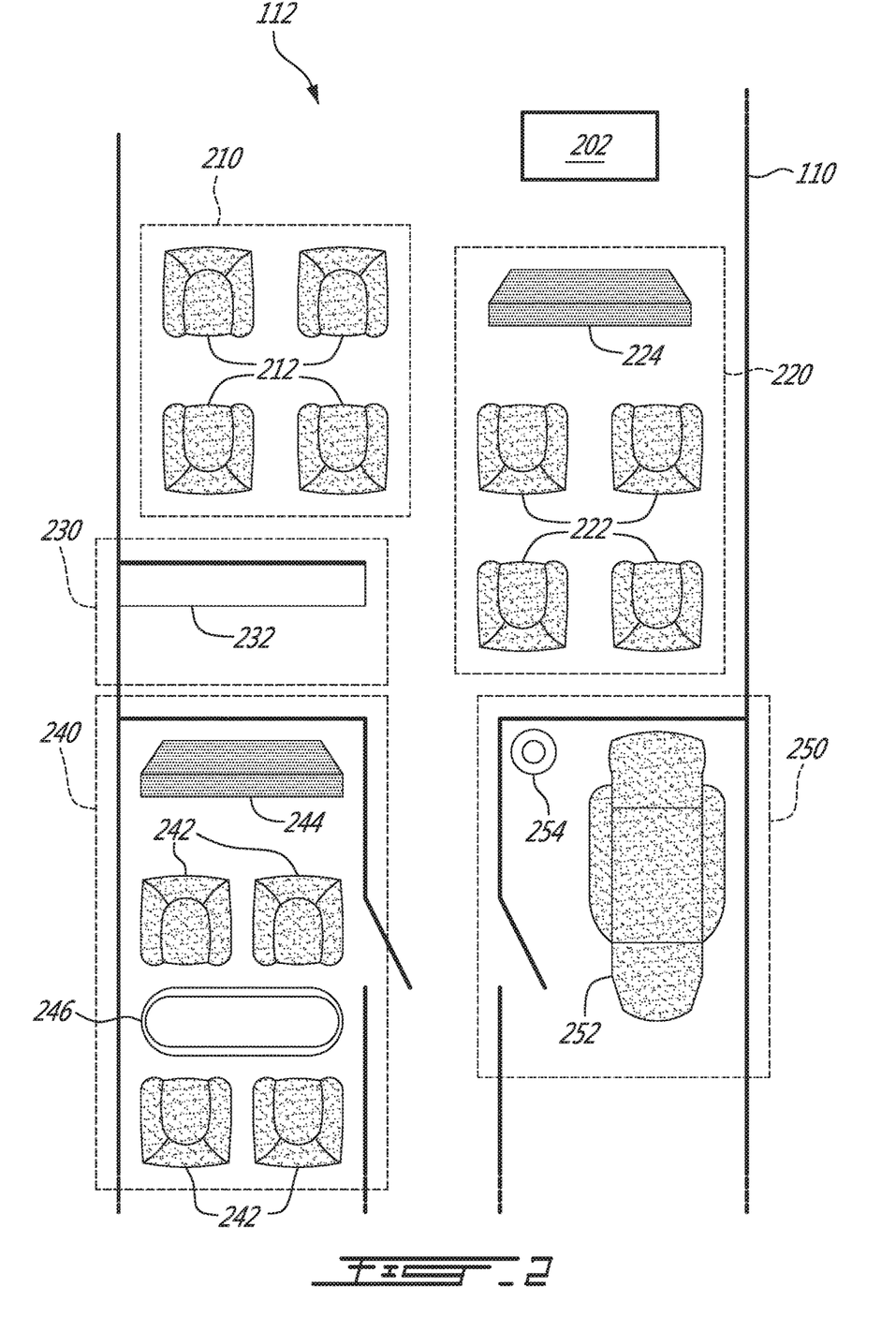
FIG. 2 is a diagram of an overhead cutaway view of a cabin of the example aircraft of FIG. 1.

With reference to FIG. 2, the fuselage 110 of the aircraft can house a cabin 112 for receiving one or more passengers. The cabin 112 can be disposed in any suitable fashion: for example, the cabin 112 can be composed of various quarters and/or rooms. In addition, the cabin 112 can be provided with various seats, electronic and entertainment systems, lavatories, galleys, and the like. For ease of discussion, the cabin 112 will be described as being composed of a plurality of zones, illustrated in FIG. 2 as zones 210, 220, 230, 240, and 250. Each zone can be associated with a specific purpose, or with an activity that a passenger may perform in the zone. It should be noted that the specific examples of zones 210-250 described herein are only examples provided for the purpose of illustration, and various other types of zones can be contemplated. In addition, it should be understood that the zones 210-250 may be altered in a dynamic fashion at suitable times, in response to suitable triggers, or in accordance with other rules and/or conditions, as described in greater detail hereinbelow.

In the embodiment illustrated in FIG. 2, the cabin 112 is divided into five zones: seating zone 210, viewing zone 220, galley zone 230, meeting zone 240, and resting zone 250. Seating zone 210 is provided with one or more seats 212, which can be disposed in any suitable fashion. Viewing zone 220 is provided with one or more seats 222 and with an entertainment device 224. The entertainment device 224 can be a television, projector, or other suitable screen, and can optionally include speakers or other sound-producing devices, one or more media sources, and the like. Galley zone 230 can be provided with various appliances for food production, and can include a food preparation area 232. Meeting zone 240 can be provided with one or more seats 242 an entertainment device 244, which can be substantially similar to the entertainment device 224, or any other suitable type of entertainment device, and a conference table 246. Resting zone 250 can be provided with a seat 252, which can be a reclining or lie-flat seat, and a lighting device 254. It should additionally be noted that each of the zones 210-250 can include, or share, one or more lighting systems, one or more heating, ventilation, and climate-control systems, one or more public address (PA) systems, and the like. It should also be noted that FIG. 2 is not necessarily illustrated to scale.

In some embodiments, the arrangement of seats 212, 222, 242, 252, in the various zones can be dynamically adjustable, as appropriate. For instance, each of the zones 210, 220, 240, 250 is configured for assuming one of a plurality of seating configurations, which can include more or fewer seats than shown in FIG. 2. In some embodiments, the position or orientation of the entertainment devices 224, 244, can be dynamically adjustable. Alternatively, or in addition, the type of entertainment devices present in zones 220, 240 can be dynamically adjustable. Still other modifications to the cabin 112, and to the zones 210-250, are considered.

The aircraft 100 is additionally provided with a noise-reduction (NR) system 202. Although illustrated here as being contained within the cabin 112, it should be understood that the NR system 202 can be located outside the cabin 112, for example in other portions of the aircraft, or in any suitable combinations of locations inside and outside the cabin 112. The NR system 202 serves to reduce the amount of noise present in the cabin 112, or in other parts of the aircraft, for instance the cockpit 120. Noise can originate from a number of different sources, including engines 150 of the aircraft, movement of flight surfaces on the wings 140 and/or tail 160, and from air resistance experienced by the aircraft 100 during a flight mission. Other sources of noise, including hydraulic systems, motors, and other systems or components are also considered.

In some embodiments, the NR system 202 includes an active NR (ANR) system, which includes one or more speakers and one or more microphones. The ANR system operates by counteracting sound waves within the cabin with supplementary sound waves of equal magnitude but opposite phase, thereby additively cancelling with the sound waves within the cabin. The microphones can be disposed about the cabin in any suitable arrangement, and are configured to collect audio data indicative of sound waves which traverse at least part of the cabin. The ANR system can then process the audio data, for instance using a computing device, to determine appropriate counteractive sound waves. The speakers, which can be disposed throughout the cabin in any suitable arrangement, can then produce the counteractive sound waves to counter the sound waves within the cabin. In some embodiments, the ANR system includes multiple localized ANR systems, which can work collaboratively to provide ANR for the cabin 112.

In some other embodiments, the NR system 202 includes a synchrophasing module. As used herein, "synchrophasing" refers to the practice of synchronizing the phase of propellers or fan blades of an aircraft. Altering the phase difference between engine propellers or fan blades changes how sound waves produced by the engines interact within the cabin. For example, altering the synchrophasing of the propellers or fan blades can cause sound waves produced by a first engine 150 to additively cancel, via destructive interference, with sound waves produced by a second engine 150 in one portion of the cabin, and can cause sound waves produced by the first and second engines 150 to additively combine, via constructive interference, in another portion of the cabin. Synchrophasing techniques can also be applied to other sources of noise which involve rotating machinery, including hydraulic pumps, generators, and the like.

The NR system 202 can include any other suitable types of noise-reduction devices, which can incorporate other techniques. In addition, it should be understood that the NR system 202 can be configured for implementing any number of the aforementioned NR techniques substantially simultaneously, successively, or in any other suitable configuration.

In operation, the NR system 202 can be used to provide a "baseline" level of noise reduction, that is to say, to perform noise reduction within the cabin 112 such that each zone within the cabin experiences substantially equal levels of noise. It is possible that for certain zones within the cabin 112, this "baseline" level of noise reduction could be improved by altering the operation of the NR system 202. However, adjusting the operation of the NR system 202 to improve noise reduction in one zone could result in an increased noise level elsewhere in the cabin 112. Therefore, the "baseline" level of noise reduction provides a holistic approach to noise reduction within the cabin 112, such that all areas within the cabin 112 are subjected to comparable levels of noise.

The baseline level of noise reduction provided by the NR system 202 may be sufficient for meeting regulatory standards for acceptable noise levels within the cabin 112. Alternatively, or in addition, the baseline level of noise reduction provided by the NR system 202 may reduce noise in the cabin 112 to levels sufficiently low to provide a predetermined comfort level for passengers of the aircraft 100. For instance, the NR system 202 may reduce noise in the cabin 112 to a level below a predetermined threshold, for instance 80 dB, 70 dB, 60 dB, or the like. However, providing the baseline level of noise reduction can still result in passengers being uncomfortable with the level of noise present in the cabin 112.

The NR system 202 is thus configured for providing a baseline level of noise reduction within the cabin 212. In addition, the NR system 202 is configurable to reduce noise within the cabin 212 in an adjustable manner on a zone-by-zone basis. Put differently, the noise-reduction of the NR system 202 can be controlled to perform noise reduction in one or more of the zones 210-250 to adjust, for example to improve, the amount of noise reduction in one of the zones 210-250, for example in relation to the baseline noise, which will in turn produce an effect on the level of noise reduction in the other zones 210-250. For example, the NR system 202 can be controlled to perform noise reduction in the viewing zone 220 in order to minimize a noise level in the vicinity of the seats 222 and/or in the vicinity of the entertainment device 224 in the viewing zone 220. In another example, the NR system 202 can be controlled to perform noise reduction in a zone which includes the meeting zone 240 and the resting zone 250.

When the level of noise reduction in one or more of the zones 210-250 is altered, resultant changes in other ones of the zones 210-250 will inherently occur. For instance, decreasing the noise level in the meeting zone 240 from the baseline level of noise reduction may result in an increase in the noise level in the viewing zone 220. The adjusted noise level in the meeting zone 240 is lower than the level of noise in the meeting zone when the NR system 202 is performing baseline level noise reduction; conversely, the resultant adjustment in noise reduction for the viewing zone 220 may result in a noise level higher than the level of noise in the viewing zone when the NR system 202 is performing baseline level noise reduction.

As discussed, performing noise reduction in a selected one of the zones 210-250 can cause the NR system 202 to effect resultant adjustments in a noise level for one or more of the remaining zones 210-250. For example, performing noise reduction in the viewing zone 220 may increase the noise level in the galley zone 230, due to the inherent operation of the NR system 202. In some cases, the NR system 202 can evaluate the resultant adjustment in the remaining zones, and perform the noise reduction in the selected zones accordingly. For example, industry standards and/or regulatory policy can dictate maximum allowable noise levels within an aircraft. The NR system can perform noise reduction in the selected zone so that the resultant adjustment in noise level in the remaining zones does not exceed a predetermined maximum noise level, for example as established by industry standards and/or regulatory policy. In some other cases, the resultant adjustment in noise level causes a decrease in the noise level for some of the remaining zones, while other ones of the remaining zones experience an increase in noise level. It should be noted that in some instances, the remaining zones can encompass substantially the entirety of the cabin 112, or of the aircraft 100, excepting the selected zone.

Figure 3:
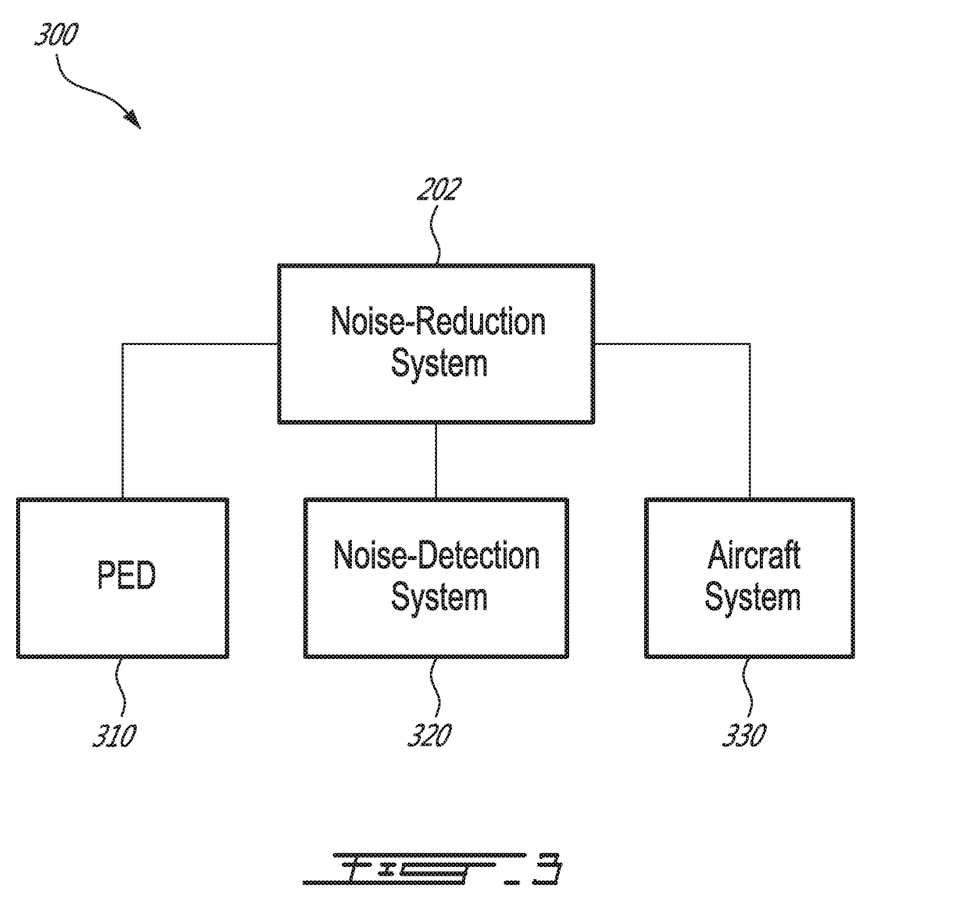
FIG. 3 is a block diagram of an example implementation of a noise reduction system for the cabin of FIG. 2.

With reference to FIG. 3, in operation, the NR system 202 obtains a noise reduction criterion from one of a plurality of potential sources, including a personal electronic device (PED) 310, a noise-detection system 320, which can detect certain non-aircraft sounds, including human voices, footsteps, etc. as well as noise produced by the aircraft 100, and/or an aircraft system 330. The noise reduction criterion provides information at least regarding one of the zones 210-250, in which noise reduction should be performed. The noise reduction criterion can be obtained in a variety of ways, and can contain a variety of additional information.

In some embodiments, the noise reduction criterion can be passenger location information obtained from the PED 310. The PED 310 can be, for example, a smartphone, featurephone, cellphone, wearable smart device, for instance a smartwatch, personal digital assistant, laptop, tablet, phablet, or other similar personal computer. The PED 310 can belong to a passenger onboard the aircraft 100, or can be associated with the aircraft 100. For example, the PED 310 is being permanently or temporarily installed in the aircraft 100 and used by a passenger during their time within the aircraft 100: for instance, the PED can be a wristband, access card, or other similar device which a passenger can carry on their person. The PED 310 can provide the NR system 202 with the noise reduction criterion using any suitable wired or wireless medium. In some embodiments, the NR system 202 receives the noise reduction criterion via Wi-Fi, Bluetooth®, or via any other suitable wireless communication protocol. In other embodiments, the NR system 202 receives the noise reduction criterion via USB®, Thunderbolt®, Ethernet, or any other suitable wired communication protocol.

In some other embodiments, the noise reduction criterion can be obtained from other systems within the aircraft 100. In some embodiments, the noise reduction criterion is obtained from the noise-detection system 320, which is configured for detecting non-aircraft-related noise within the cabin 112, including voices, footsteps, and the like. The noise-detection system 320 can be composed of a plurality of microphones and/or accelerometers which are disposed throughout the cabin 112 and/or in other locations within the aircraft 100. The noise-detection system 320 can detect the presence of noise within the cabin 112 and provide the NR system 202 with a noise reduction criterion. For example, the noise-detection system 320 can be configured for detecting noise produced by passengers of the aircraft 100, including voices, footsteps, and the like, and can identify one of the zones 210-250 as the selected zone in which noise reduction should be performed. The noise-detection system 320 can then issue a noise reduction criterion to the NR system 202. Alternatively, or in addition, the noise-detection system 320 can detect the absence of noise produced by passengers of the aircraft 100 and provide a noise reduction criterion to the NR system 202 indicating which zones can constitute the remaining zones, and instruct the NR system 202 to perform noise reduction in other zones, which constitute the selected zones. For example, if no noise is detected in zones 220-250, the noise-detection system 320 can provide the NR system 202 with a noise reduction criterion indicating that noise reduction should be performed in seating zone 210, and that zones 220-250 constitute the remaining zones. Alternatively still, the noise-detection system 320 can issue a noise reduction criterion to the NR system 202 after detecting the absence of noise produced by passengers of the aircraft 100 in one of the zones at certain times of day. For instance, at a time of day during which a passenger is likely to be sleeping, absence of noise in the resting zone 250 can be indicative of the passenger being present in the resting zone 250. As a result, the noise-detection system 320 can issue a noise reduction criterion to the NR system 202 indicating that noise reduction should be performed in the resting zone 250.

In another example, the noise reduction criterion can be obtained from an aircraft system 330 of the aircraft 100. The aircraft system 330 can be configured for monitoring the operation of various systems within the aircraft 100, and can provide the NR system 202 with a noise reduction criterion based on events which occur within the aircraft 100. Still other approaches for obtaining the noise reduction criterion are considered.

The noise reduction criterion can provide the NR system 202 with various information, depending on the device communicating the noise reduction criterion and the nature of the noise reduction to be performed. In some embodiments, the noise reduction criterion can be provided by the PED 310 described hereinabove. The PED 310 can provide, as part of the noise reduction criterion, an indication of a location within the cabin 112 at which the PED 310 is located. The PED 310 can detect its location in any suitable fashion, for instance by using GPS, by triangulating from a plurality of WiFi, Bluetooth®, or networking beacons located within the cabin 112, or in any other suitable fashion. In some cases, the noise reduction criterion includes an absolute location of the PED 310, in other cases, the location of the PED 310 is based on a reference point within the aircraft 100. In other cases, the noise reduction criterion can indicate a room, or one of the zones 210-250, in which the PED 310 is located. Other approaches are also considered.

In some embodiments, the PED 310 can provide the NR system 202 with the noise reduction criterion in response to a user input from the passenger using the PED 310. For example, the passenger can indicate via the PED 310 that noise reduction should be performed in a particular one of the zones 210-250, for instance the resting zone 250. In response to the user input, the PED 310 can issue a noise reduction criterion to the NR system 202. In other instances, the PED 310 can automatically detect changes in the location of the PED 310, for example by sensing movement of the passenger using the PED 310, or based on known locations of network beacons within the cabin 112. The PED 310 can be configured for providing a noise reduction criterion to the NR system 202 in response to any suitable sensed movement or change in the location of the PED 310.

In some embodiments, the PED 310 is also configured for providing the NR system 202 with information for modifying the layout of the zones 210-250. For example, a passenger can indicate via the PED that zones 210 and 220 should be combined into a single zone. In another example, the passenger can indicate via the PED that zone 210 should be subdivided into two smaller zones. Still other examples are considered.

In some other embodiments, the noise reduction criterion can be provided to the NR system 202 based on the occurrence of an event within the aircraft 100, for example as detected by the aircraft system 330. The aircraft system 330 can include various subsystems associated with different functionality available onboard the aircraft 100. For example, the aircraft system 330 includes a cabin management subsystem which monitors the use of in-flight entertainment devices, for instance the entertainment devices 224, 244. In another example, the aircraft system 330 includes a flight management subsystem which monitors flight phases, time of day, and the like. In a further example, the aircraft system 330 includes an avionics subsystem, which monitors changes in the operation of the engines 150 of the aircraft 100. The aircraft system 330 can issue noise reduction criteria for the NR system 202 based on this monitoring.

In one example, the aircraft system 330 can detect the activation of an entertainment device within the aircraft, or a change in a setting of an entertainment device, for instance one of the entertainment devices 224, 244. The change in setting can include adjusting a volume level, activating or deactivating a mute setting, beginning, pausing, or ending playback of a media content, or any other suitable setting.

In another example, the aircraft system 330 can detect events relating to a change in a lighting system within the cabin 112. Changes in the lighting control system can include activating lights within one of the zones 210-250, adjusting a brightness or colour setting for lights within one of the zones 210-250, or any other suitable event. In a further example, the aircraft system 330 can detect events relating to a change in a climate-control system within the cabin 112. Changes in the climate-control system can include changes in a temperature or airflow setting for one of the zones 210-250.

Still other types of events are considered. For example, the aircraft system 330 can detect movements of passengers within the cabin 112, for instance via any suitable type of movement detection system. The aircraft system 330 can use detected movements of passengers to produce noise reduction criterion, which can then be provided to the NR system 202. For example, the aircraft system 330 can detect a passenger entering a room, which can substantially correspond to one of the zones 210-250, and the noise reduction criterion can select the corresponding zone as the zone in which noise reduction should be performed. In another example, the avionics can be preprogrammed to issue noise reduction criterion at predetermined times of the day or based on preset conditions. For instance, noise reduction criterion can be issued by the PED 310 based on a schedule of activities for one or more passengers which is stored on the PED 310. Some scheduled activities can be associated with preset conditions: a calendar entry indicating a meeting can be associated with a "meeting time" preset condition, which causes noise reduction to be performed in the meeting zone 240. In another example, a calendar entry indicating a date night or family time can be associated with a "movie time" preset condition, which causes noise reduction to be performed in the viewing zone 220. Still other approaches are considered.

Other time-based events are also considered. For example, the aircraft system 330 can issue noise reduction criterion based on a flight time for a flight mission which the aircraft 100 is undertaking. A short flight mission can indicate that passengers are likely to be present in the seating zone 210 and/or the viewing zone 220, so a noise reduction criterion can be provided to the NR system 202 to perform noise reduction in the zones 210, 220. In another example, a noise reduction criterion can be issued based on the flight phase of the flight mission: during takeoff, a noise reduction criterion can be issued to perform noise reduction in the seating zone 210, and once a cruise altitude and speed is reached, a noise reduction criterion can be issued to perform noise reduction in the viewing zone 220.

In this fashion, any one of the PED 310, the noise-detection system 320, and the aircraft system 330 can provide the NR system 202 with noise reduction criterion based on any suitable information. The noise reduction criterion can be based on a location within the cabin 112 at which a passenger is present, or at which a passenger is expected to be present. For example, and with additional reference to FIG. 2, the aircraft system 330 can detect that an entertainment device 224 has been actuated, but that no passengers are present within zone 220. However, the actuation of the entertainment device 224 can signal that a passenger will forthcomingly be present in zone 220, and the aircraft system 330 can pre-emptively provide a noise reduction criterion to the NR system 202, expecting a passenger to be present in zone 220.

In some embodiments, the NR system 202 implements one or more artificial intelligence (AI) algorithms for producing noise reduction criterion based on patterns of use of the different zones 210-250 of the cabin 112 and the various elements provided in the cabin 112. For example, the AI algorithm can recognize that passengers are often present in the meeting zone 240 when the aircraft 100 is scheduled to fly a particular route. In response to a subsequent scheduling of the particular route, the AI algorithm can cause the NR system 202 to follow a noise reduction criterion specifying the meeting zone 240 as a zone for which noise reduction should be performed. In another example, the AI algorithm can recognize that passengers are often present in the resting zone 250 at particular times, for example at night (based on any suitable time zone). In response to the aircraft 100 being used for an overnight flight, the AI algorithm can cause the NR system 202 to follow a noise reduction criterion specifying the sleeping zone 250 as a zone for which noise reduction should be performed after nightfall.

The AI algorithm can be used as a backup if certain sensors or other information-gathering devices within the cabin 112 fail. For instance, if motion detectors within the cabin 112 fail, the AI algorithm can be used to predict where passengers may be located within the cabin 112. Alternatively, or in addition, the AI algorithm can produce certain noise reduction criterion based on patterns of use of the NR system 202, and these noise reduction criterion can be validated against other information obtained by the PED 310, the noise-detection system 320, and/or the aircraft system 330, as appropriate.

In some embodiments, the noise reduction criterion can additionally indicate what type of resultant adjustment should occur for one or more of the remaining zones. For example, the noise reduction criterion indicates that the resultant adjustment in one or more of the remaining zones should cause an increase in noise level up to a predetermined maximum, for example based on regulatory standards. In another example, the noise reduction criterion indicates that the resultant adjustment in the remaining zones should, as much as possible, maintain the baseline noise reduction level for some of the remaining zones. In a further example, the noise reduction criterion indicates that the resultant adjustment in the remaining zones should result in an increase in noise to a predetermined level. In other embodiments, the noise reduction criterion does not specify what effect the resultant change should have for the remaining zones, and the NR system 202 can implement the noise reduction for the selected zone in any manner appropriate.

With continued reference to FIGS. 2 and 3, once the noise reduction criterion is obtained at the NR system 202, the NR system 202 is configured for determining one of the zones 210-250 in which noise reduction should be performed, based on the noise reduction criterion. In some cases, the noise reduction criterion can specify one of the zones 210-250. In other cases, the NR system 202 interprets the noise reduction criterion to determine in which of the zones 210-250 noise reduction should be performed. For instance, if the noise reduction criterion indicates the presence of passengers in zone 220, the NR system 202 determines that noise reduction should be performed in zone 220. In another example, if the noise reduction criterion indicates that passengers are expected to be present in zone 240, the NR system 202 determines that noise reduction should be performed in zone 240.

Once the NR system 202 has determined in which of the zones 210-250 noise reduction is to be performed, operation of the NR system 202 can be controlled to perform noise reduction in the determined zone. Performing noise reduction can include adjusting the response of the NR system 202 such that a noise level in the determined zone reaches an optimized level, as determined through feedback from a noise detection system 320. Alternatively, the noise level in the determined zone may be adjusted to a predetermined level, or a specified level, for instance as indicated by the noise reduction criterion. Alternatively, or in addition, performing noise reduction can include adjusting the response of the NR system 202 such that the resultant adjustment in one or more of the remaining zones matches certain predetermined criteria, or criteria specified as part of the noise reduction criterion.

In some embodiments, operation of the NR system 202 is governed by one or more algorithms which weight the response of the NR system 202. For example, the algorithms can be used to weight the noise-reduction contribution of different subsystems of the NR system 202, for instance the ANR system and the synchrophasing module. Alternatively, or in addition, the algorithms can be used to estimate the resultant adjustment in the remaining zones 210-250, and the response of the NR system 202 can be based on the algorithms such that the resulting adjustment in the remaining zones 210-250 matches requested adjustments indicated in the noise reduction criterion. Alternatively, the noise reduction in the selected zone may be selected based on sense-and-respond feedback from microphones and/or accelerometers of the noise detection system 320, which are located in the selected zone. In some embodiments, the algorithms include one or more machine learning algorithms which can be used to estimate or model the response of the NR system 202, and assist in setting operational parameters for the NR system 202. Still other approaches are considered.

In some embodiments, the different noise-producing elements of the aircraft—the engines 150, the movement of flight surface on the wings 140 and/or tail 160, the air resistance experienced by the aircraft 100, the hydraulic systems, motors, and the like—produce noise having different tonality (i.e., different frequencies). The NR system 202 can be configured for obtaining noise reduction criterion which specify a particular tonality of noise to be reduced in one of the zones 210-250, and the NR system 202 can perform tone-based noise reduction depending on the requirements specified in the noise reduction criterion.

For example, certain flight phases can be associated with increased noise of a particular tonality: take-off, approach, and landing can cause increased noise from the hydraulics systems of the aircraft 100, whereas the engines 150 can produce increased noise during cruise portions of the flight mission. The NR system 202 can be configured for using the flight phase to adjust noise reduction in one of the zones 210-250 based on the type of noise produced during certain flight phases. Additionally, certain ones of the zones 210-250 can be more prone to noise of a particular tonality than others. For instance, seating and viewing zones 210 and 220, which are in a mid-section of the cabin 212, can be subjected to more noise by the hydraulics systems; conversely, meeting and resting zones 240, 250, which are in an aft-section of the cabin, 212, can be subjected to more noise by the engines 150. The hydraulics systems and the engines 150 can produce noise of different tonalities, and the NR system 202 can account for the tonality of noise subjected to each zone 210-250 when performing noise reduction. For example, the response of the NR system 202 can be tuned differently when performing noise reduction in the seating zone 210 than when performing noise reduction in the meeting zone 240, to account for the difference in tone of noise in each zone.

Figure 4:
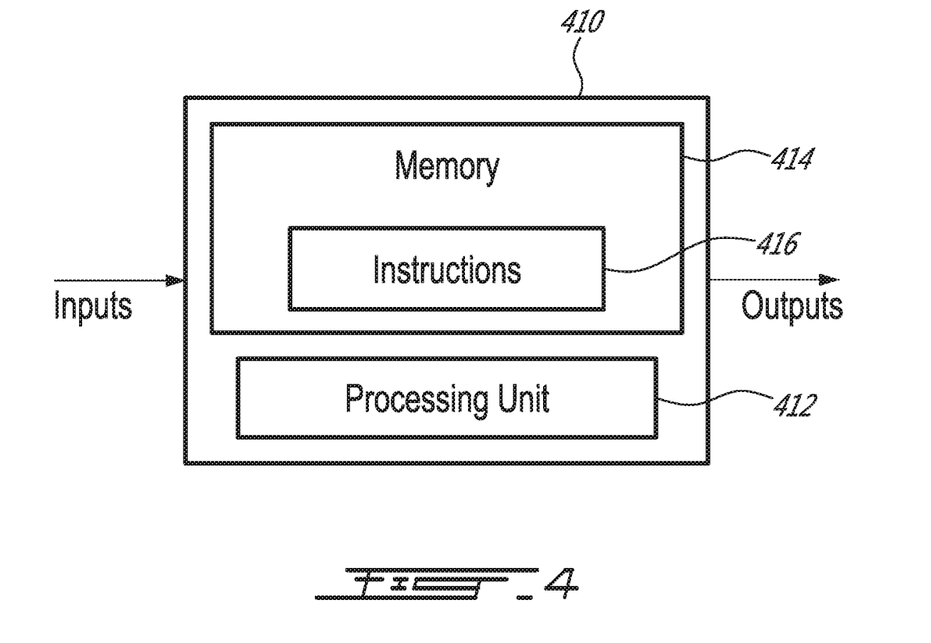
FIG. 4 is a block diagram of an example computing system for implementing one or more elements of FIG. 3.

With reference to FIG. 4, at least part of the NR system 202 can be implemented using a computing device 410. The computing device 410 comprises a processing unit 412 and a memory 414 which has stored therein computer-executable instructions 416. The processing unit 412 can comprise any suitable devices configured to cause a series of steps to be performed so as to implement at least part of the functionality of the NR system 202. For instance, instructions 416, when executed by the computing device 410 or other programmable apparatus, can cause the functions/acts/steps specified in the present disclosure to be executed. The processing unit 412 can comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 414 can comprise any suitable known or other machine-readable storage medium. The memory 414 can comprise non-transitory computer readable storage medium including, for example, but not limited to, an electronic, magnetic, optical, electromagnetic, infrared, or semiconductor system, apparatus, or device, or any suitable combination of the foregoing. The memory 414 can include a suitable combination of any type of computer memory that is located either internally or externally to device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory 414 can comprise any storage means (e.g., devices) suitable for retrievably storing the computer-executable instructions 416 executable by processing unit 412.

Figure 5:
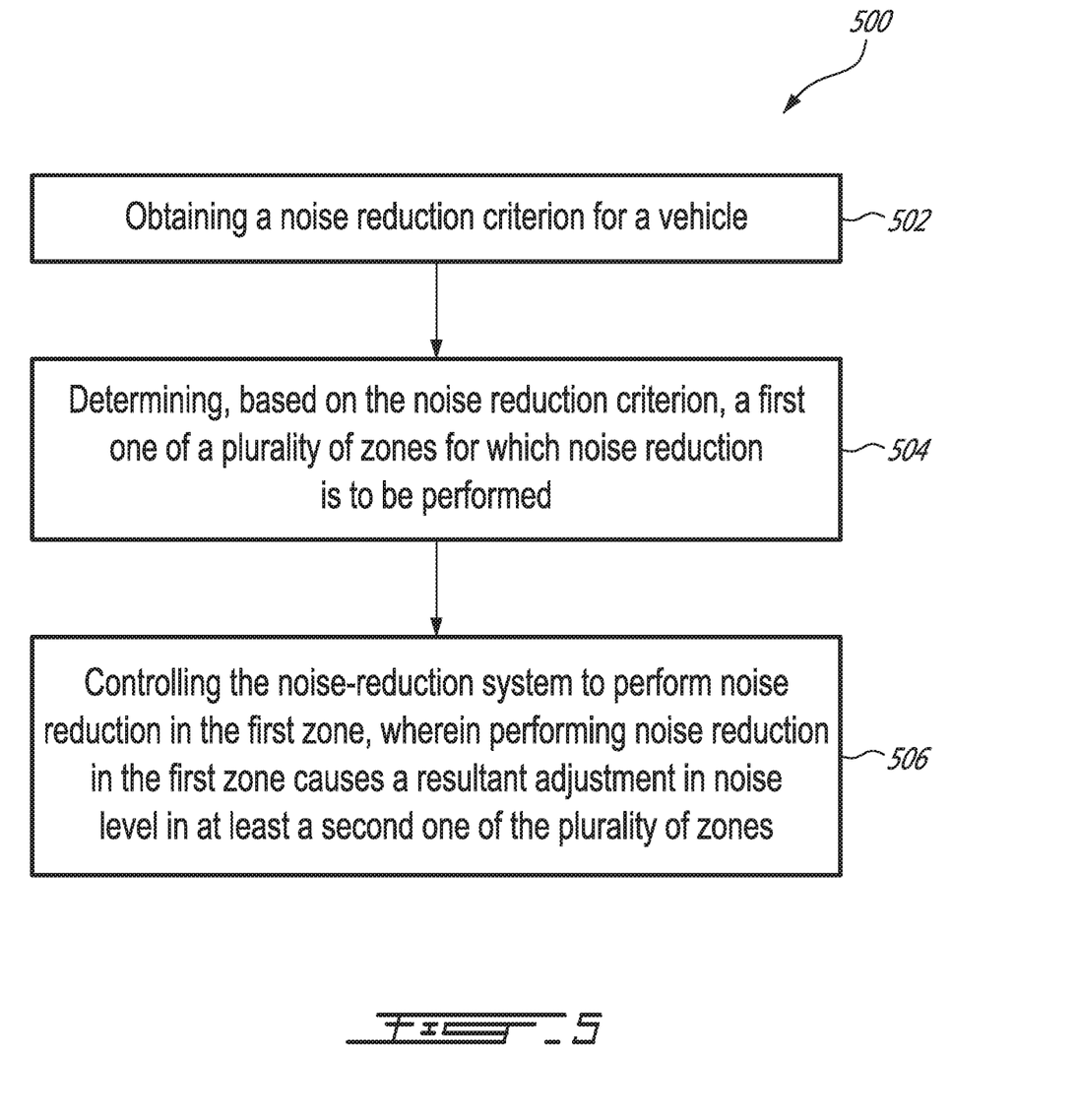
FIG. 5 is a flowchart illustrating an example method for performing noise reduction in a vehicle.

With reference to FIG. 5, there is provided a method 500 for performing noise reduction in a vehicle, for instance the aircraft 100, which is divided into, or otherwise contains, a plurality of zones, for instance the zones 210-250 of the cabin 112, as illustrated in FIG. 2.

At step 502, a noise reduction criterion for the vehicle is obtained. The noise reduction criterion can specify a zone in which noise reduction is to be performed. In some embodiments, the noise reduction criterion may further specify a desired level of noise, and details regarding the resultant change in remaining zones, including the type of noise change, the resultant noise levels, and the like.

At step 504, a first one of the plurality of zones, for which noise reduction is to be performed, is determined based on the noise reduction criterion. In embodiments in which the noise reduction criterion includes an indication of the first zone, the first zone can be determined from the noise reduction criterion itself. In embodiments in which the noise reduction criterion includes other information, such as a zone in which a passenger is present, or is expected to be present, the first zone can be determined based on the other information provided as part of the noise reduction criterion.

At step 506, a noise reduction system, for example the NR system 202, is controlled to perform noise reduction in the first zone. By performing noise reduction in the first zone, the NR system 202 effects a resulting adjustment in noise level in at least a second one of the plurality of zones. The resulting adjustment occurs as an inherent side-effect of the adjustment of the noise reduction performed for the first zone: because the behaviour of the NR system 202 is adjusted to perform noise reduction in the first zone, the level of noise reduction performed in the remaining zones is also affected.

The methods and systems for performing noise reduction in a vehicle described herein may be implemented in a high-level procedural or object-oriented programming or scripting language, or a combination thereof, to communicate with or assist in the operation of a computer system, for example the computing device 410. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or more specifically the at least one processing unit 412 of the computer 410, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Various aspects of the methods and systems disclosed herein, as well as a vehicle, for instance an aircraft, itself implementing various aspects of the methods and systems disclosed herein, may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the preferred embodiments set forth in the examples, but should be given the broadest reasonable interpretation consistent with the description as a whole.

The invention claimed is:

1. A system for performing noise reduction in a vehicle comprising a plurality of zones, the system comprising:
   a noise-reduction system capable of performing noise reduction in each of the plurality of zones;
   a processing unit communicatively coupled to the noise-reduction system and configured for controlling operation thereof; and
   a non-transitory computer-readable medium having stored thereon computer-readable instructions which, when executed by the processing unit, cause the processing unit to perform:
   obtaining a noise reduction criterion for the vehicle;
   determining, based on the noise reduction criterion, a first one of the plurality of zones for which noise reduction is to be performed; and
   controlling the noise-reduction system to perform noise reduction in the first zone, wherein performing noise reduction in the first zone causes the noise reduction system to effect a resultant adjustment in noise level in at least a second one of the plurality of zones.

2. The system of claim 1, wherein performing noise reduction in the first zone results in an increase in a noise level for the at least one second zone.

3. The system of claim 1, wherein the resultant adjustment in noise level produces an increase in the noise level in the at least one second zone.

4. The system of claim 1, wherein the resultant adjustment in noise level produces a decrease in the noise level in the at least one second zone.

5. The system of claim 1, wherein the at least one second zone comprises substantially the entire vehicle excepting the first zone.

6. The system of claim 1, wherein the at least one second zone comprises a portion of the vehicle different from the first zone.

7. The system of claim 1, wherein the first zone comprises a vicinity of a grouping of seats within the vehicle.

8. The system of claim 1, wherein the first zone comprises a vicinity of an entertainment device within the vehicle.

9. The system of claim 1, wherein the first zone comprises a vicinity of resting quarters within the vehicle.

10. The system of claim 1, wherein obtaining the noise reduction criterion comprises obtaining, from a personal electronic device, an indication of a location of the personal electronic device within the vehicle, wherein the first zone comprises at least the location.

11. The system of claim 10, wherein the indication is issued by the personal electronic device in response to a user input.

12. The system of claim 10, wherein the indication is issued by the personal electronic device in response to the personal electronic device detecting a change in the location of the personal electronic device.

13. The system of claim 12, wherein the change in location of the personal electronic device is detected by sensing movement of a user of the personal electronic device.

14. The system of claim 1, wherein obtaining the noise reduction criterion comprises obtaining, from a noise-detection system of the vehicle, an indication of the first zone based on a sound produced by a passenger of the vehicle and detected by the noise-detection system.

15. The system of claim 1, wherein obtaining the noise reduction criterion comprises obtaining the noise reduction criterion in response to occurrence of an event within the vehicle, wherein the event is one of: activation of an entertainment device within the vehicle, activation of a lighting system within the vehicle, activation of a climate-control system within the vehicle, and a passenger of the vehicle entering a room within the vehicle.

16. The system of claim 1, wherein the noise reduction criterion is indicative of a location within the vehicle at which a passenger of the vehicle is present.

17. The system of claim 1, wherein the noise reduction criterion is indicative of a location within the vehicle at which a passenger of the vehicle is expected to be present.

18. The system of claim 1, wherein the noise reduction criterion is indicative of an operating condition of an entertainment device of the vehicle.

19. The system of claim 1, wherein the noise reduction criterion is indicative of a time of day.

20. The system of claim 1, wherein the noise reduction criteria specifies at least one of: the first zone, the at least one second zone, an amount of noise reduction to perform in the first zone, and a type for the resultant adjustment in the at least one second level of noise reduction.

21. The system of claim 1, wherein controlling the noise-reduction system of the vehicle comprises adjusting, based on the noise reduction criterion, a weighting factor of a noise-reduction algorithm governing the noise-reduction system.

22. The system of claim 1, wherein controlling the noise-reduction system of the vehicle comprises adjusting the operation of at least one of an active noise-reduction system and an engine-synchrophasing module.

23. The system of claim 1, wherein the noise reduction criteria specifies a tonality of noise to be reduced.

* * * * *